3,579,463
METHOD OF PREPARING CRYSTALLINE
CALCIUM HALOPHOSPHATE PHOSPHOR
Anselm Wachtel, Parlin, N.J., assignor to Westinghouse
Electric Corporation, Pittsburgh, Pa.
Filed May 7, 1969, Ser. No. 822,501
Int. Cl. C09k 1/36
U.S. Cl. 252—301.4                    8 Claims

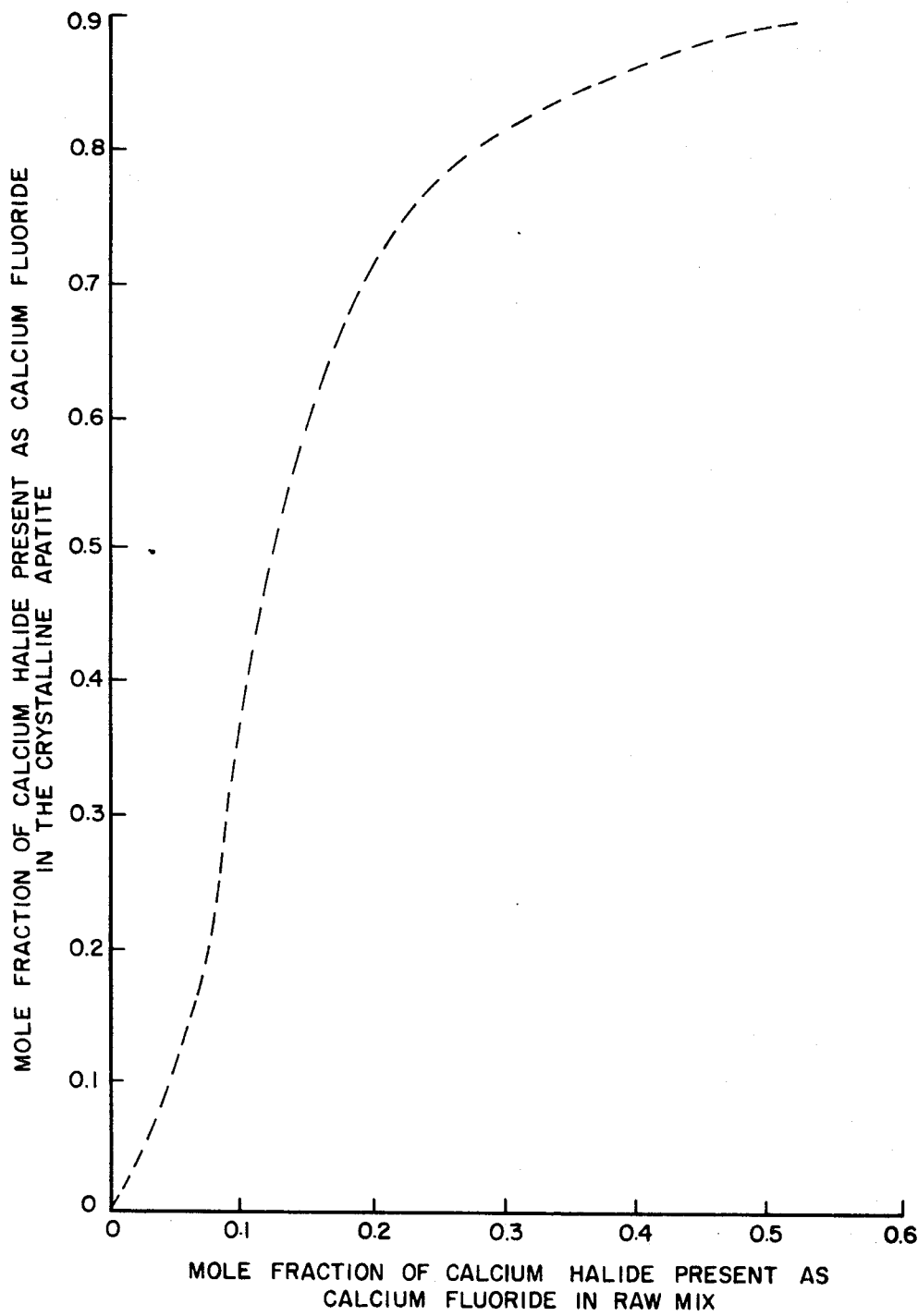

ABSTRACT OF THE DISCLOSURE

Method of preparing crystalline calcium halophosphate of a particle size distribution which can be advantageously used in commercial fluorescent lamps. A raw mix is prepared of the constituents required to form the calcium halophosphate matrix with an excess of calcium and halogen constituents in predetermined amounts. The firing is carried out at a predetermined temperature and time to form the halophosphate matrix having the desired crystallinity and particle size distribution. Then, a selected amount of activator constituent is mixed with the halophosphate matrix and is incorporated into the matrix during a subsequent firing to form the phosphor.

BACKGROUND OF THE INVENTION

It is generally conceded that phosphors of improved luminescent output can be achieved by improving the morphology and crystallinity of the phosphor. With particularly reference to halophosphate phosphors, the original well defined morphology of the raw mix constituents, typically dibasic calcium orthophosphate, is severely affected in the process of incorporating the activators and forming the halophosphate composition which is generally expressed as $M_5(PO_4)_3X$, wherein M is an alkaline-earth metal, preferably calcium and selected activators and X is halogen constituent. The composition is also expressible as $3M_3(PO_4)_2 \cdot MX_2$.

The literature indicates that a well structured halophosphate matrix can be prepared by forming the halophosphate in the presence of calcium chloride, described by R. D. Morton, Norsk. Geol. Tidsskr., 41, 223 (1961). Further work, in which a halophosphate with a fluorine-chlorine content was prepared is described by the present applicant in the Journal of Electrochemical Society, vol. 113, No. 2, page 128 (1966). The halophosphate matrix and phosphors produced previously have been unsatisfactory for lamp applications because of the very coarse particle size which ranged from about 50 to 200 microns and moreover, required uneconomically long refiring time to diffuse the activators throughout the large particles. It is generally accepted that a good lamp phosphor desirably has an average particle size of predominantly from about 5 to 30 microns.

SUMMARY OF THE INVENTION

It is an object of the present invention to prepare calcium halophosphate phosphor with superior crystalline structure and with a particle size range which allows the phosphor to be advantageously utilized in lamps.

It is a further object of the invention to form a well structured halophosphate matrix and then to incorporate the activator constituents without disturbing the morphology of the basic halophosphate structure.

These objects and others which will become apparent as the description proceeds are achieved by preparing a raw mix of calcium-containing constituent, phosphate-radical-containing constituent, and halogen-containing constituent. The calcium-containing constituent is included in an amount so as to provide at least about 10% gram-atom excess of calcium over the amount which will form halophosphate matrix with the phosphate-radical and the halogen. The halogen-containing constituent is included in an amount which provides at least about a 20% gram-atom excess of halogen over that which will form the halophosphate matrix with the calcium and the phosphate-radical. The gram-atom ratio of this excess calcium to halogen is about 1:2. The excess calcium and halogen are preferably supplied as calcium halide. The raw mix is then fired to form the calcium halophosphate matrix. The additional calcium halide apparently acts as a flux and is removed from the halophosphate matrix after it cools. A well defined apatite matrix results, and this material is mixed with selected amounts of activator constituent and heated to incorporate the activator and form calcium halophosphate. When this process is carried out utilizing the prescribed quantity of excess calcium and halogen, and the firing is within the temperature and time ranges specified, the resulting phosphor has a particle size distribution such that at least 50% by weight of the phosphor has an average particle diameter of less than twenty microns, and substantially all of the phosphor will pass through a 400 mesh sieve. This phosphor is particularly adaptable for use in fluorescent lamps.

BRIEF DESCRIPTION OF THE DRAWING

The sole figure is a plot of the mole fraction of calcium halide present as calcium fluoride in the raw mix against the mole fraction of calcium halide present in the apatite as calcium fluoride.

DESCRIPTION OF THE PREFERED EMBODIMENTS

Example I

A raw mix is prepared by thoroughly mixing the following constituents: 4.8 moles $CaHPO_4$; 3.52 moles $CaCO_3$; 1.68 moles $CaF_2$; 2.24 moles $NH_4Cl$. This mixture is then fired in air in a non-reactive container, such as a covered alumina tray, at a temperature of from 1000° C. to 1150° C., and preferably at 1050° C., for from 3 to 7 hours. The minimum temperature is the temperature at which the additional calcium halide can form in the molten state. The calcium halophosphate $$Ca_5(PO_4)_3(F_{0.9}Cl_{0.1})$$

which is produced above will have F/Cl atom ratio which depends upon the relationship of total F/Cl in the raw mix, for example the preferable 9/1 ratio in the halophosphate is had by providing a F/Cl atom ratio of about 1.5 in the raw mix.

The use of very large amounts of excess calcium and halogen makes it inconvenient to remove the calcium halide which forms from the formed matrix and for this reason it is preferred that the calcium be present in amount which provides from 10 to 50% gram-atom excess of calcium over that amount which forms calcium halophosphate matrix.

The fired material, after cooling, is broken into small pieces and leached in distilled water to remove excess calcium halide. During this process, the excess $CaCl_2$ goes into solution, while most of the excess $CaF_2$ is in very finely divided form which does not readily settle and can therefore be removed by decantation. After washing, and a further milling and settling of the halophosphate, some small particles of remaining $CaF_2$ can be decanted from the solution. A portion of the $CaF_2$ remains with the halophosphate; this $CaF_2$ can be further reduced or eliminated by washing with $Al(NO_3)_3$ solution. The composition is passed through a 400 mesh screen with milling as needed. The particle size distribution is such that about 50 percent by weight of the material has an average particle diameter of less than 20 microns. The particle sizes can be determined using a Fisher Sub-Sieve Sizer or a Coulter Counter which are well known analytical instruments. This material is now ready for use in producing an activated halophosphate phosphor.

It has also been discovered that any remaining $CaF_2$ can be converted into further halophosphate by adding sufficient phosphate radical containing compound, such as diammonium phosphate, with the activator constituents to allow for formation of additional calcium halophosphate during the firing which effects incorporation of the activators to form antimony and manganese acitvated calcium halophosphate phosphor.

When the halophosphate matrix prepared as described above is leached with distilled water only, about 4.6 percent by weight of the remaining material is calcium fluoride. The halophosphate phosphor is then preferably prepared by including the activating constituents antimony oxide and manganese carbonate, and sufficient molar amounts of $(NH_4)_2HPO_4$ to react with these, as well as, additionally, to provide a ratio of 3/5 of $(NH_4)_2HPO_4$ to $CaF_2$. The $CaF_2$ in this mixture reacts with the $(NH_4)_2HPO_4$ to form additional halophosphate, and the antimony and manganese are incorporated into this matrix forming calcium halophosphate phosphor.

It is, in particular, desirable to include an amount of phosphate radical containing compound with the composition before the final activation firing to adjust the ratio of metal, i.e. calcium, antimony, and manganese, to the phosphorus. This atom ratio is preferably adjusted to about 4.79–4.99 to 3 as is known in the art.

The halophosphate formed by the combination of the $CaF_2$, and the $(NH_4)_2HPO_4$ appears to grow epitaxially onto the previously formed halophosphate matrix. The ratios of antimony and manganese can be adjusted as known in the art, for example the antimony is preferably 1.6 weight percent of the halophosphate, and the manganese about 0.8 weight percent of the halophosphate. The well formed matrix when admixed with the activator constituents which are typically supplied as oxides or carbonates are preferably heated to about 1150° C. for about three hours to form the halophosphate phosphor.

Example II

In another specific example a raw mix is prepared by thoroughly mixing the following constituents: 4.8 moles $CaHPO_4$; 2.4 moles $CaCO_3$; 1.68 moles of $CaF_2$; 1.12 moles of $CaCl_2$. This raw mix is fired, processed to remove excess calcium halide and activated as explained in Example I. The resulting calcium halophosphate phosphor has a fluorine to chlorine atom ratio of about 9/1.

In the foregoing examples the raw mix constituent ratios were determined to provide a F/Cl atom ratio of 9/1 to the finished phosphor. Halophosphate phosphor can be prepared with widely varying fluorine to chlorine atom ratios by controlling the raw mix ratios of these materials. The foregoing examples show that fluorine is selectively incorporated into the halophosphate structure. The sole figure shows the selective incorporation of calcium fluoride into the apatite structured halophosphate phosphor from the calcium fluoride and calcium chloride present in the raw mix. This curve tells one what the ratio of calcium fluoride to calcium chloride must be in the raw mix to provide a predetermined ratio of fluorine to chlorine in the crystalllzed apatite.

Other additives are known to be useful with the halophosphate photphors, such as cadmium and selected rare-earth metals.

The firing temperature and time expressed in the preferred example can be varied from about 1000 to 1150° C. for from three to seven hours with the higher the firing temperature the shorter the firing time.

The present method has been described by way of example with specific raw mix constituents, the particular constituents used need only be reacted at the temperatures specified and in proportions to supply the proper amounts of calcium, phosphate radical, and halogen.

I claim as my invention:

1. Method of preparing crystalline calcium halophosphate phosphor represented by the formula $M_5(PO_4)_3X$, wherein M is calcium and selected metallic activators, and X is fluorine and chlorine, and said phosphor exhibits a particle size distribution such that at least 50% by weight of said phosphor has an average particle diameter of less than 20 microns, which method comprises:

(a) preparing a raw mix comprising calcium containing constituent, phosphate-radical containing constituent, and halogen-containing constituent in such amounts that said calcium containing constituent is included in an amount which provides at least about a 10% gram-atom excess of calcium over that amount of calcium which will form halophosphate matrix with said phosphate radical and with halogen, and said halogen-containing constituent is included in an amount which provides at least about a 20% gram-atom excess of halogen over that which will form halophosphate matrix with said phosphate radical and with said calcium, with the gram-atom ratio of said excess calcium to excess halogen being about 1:2;

(b) firing said raw mix at a temperature of from 1000° C. to 1150° C. for from 3 to 7 hours to form the halophosphate matrix;

(c) removing substantially all of said excess calcium and halogen from said halophosphate matrix;

(d) adding predetermined amounts of selected activator constituents; and (e) firing the resulting mixture at a predetermined temperature and for a predetermined time to incorporate said activators to form activated calcium halophosphate phosphor.

2. The method as specified in claim 1, wherein said calcium-containing constituent is included in an amount which provides up to about a 50% gram-atom excess of calcium over the amount of calcium which forms said halophosphate matrix.

3. The method as specified in claim 1, wherein said excess calcium and halogen are included in said raw mix as calcium halide.

4. The method as specified in claim 3, wherein said calcium halide is in an amount which provides about 20 atom percent excess of calcium over the amount which will react with the phosphate radical to form said halophosphate.

5. The method as specified in claim 1, wherein said firing of said raw mix is at a temperature o fabout 1050° C. for from three to seven hours to form the halophosphate matrix.

6. The method as specified in claim 1, wherein said firing of the activator constituents and said halophosphate matrix is at about 1150° C. for about three hours.

7. The method as specified in claim 1, wherein a portion of said excess calcium and halogen remains with said halophosphate matrix, and a predetermined amount of phosphate-radical-containing compound is mixed and heated with said selected amounts of activator constituent and said halophosphate matrix to form additional calcium halophosphate phosphor by reacting with said remaining portion of said excess calcium and halogen.

8. The method as specified in claim 1, wherein the atom ratio of fluorine to chlorine in the phosphor is about 9 to 1, which ratio is achieved by providing a gram atom ratio of fluorine to chlorine in said raw matrix of about 1.5.

References Cited

UNITED STATES PATENTS

| | | | |
|---|---|---|---|
| 2,447,210 | 8/1948 | Roberts | 252—301.4X |
| 2,579,900 | 12/1951 | Butler | 252—301.4 |
| 2,596,509 | 5/1952 | Ranby | 252—301.4 |
| 2,968,626 | 1/1961 | Rimbach | 252—301.4 |
| 3,017,365 | 1/1962 | Harrison | 252—301.4 |

HELEN M. McCARTHY, Primary Examiner

J. COOPER, Assistant Examiner